United States Patent [19]

Yeh

[11] Patent Number: 4,800,617
[45] Date of Patent: Jan. 31, 1989

[54] CASTOR POSITIONING DEVICE

[76] Inventor: Tsuang H. Yeh, No. 21, Chung Chyau 2 St., Ta-Li Shiang, Taichung Hsien, Taiwan

[21] Appl. No.: 157,247
[22] Filed: Feb. 18, 1988
[51] Int. Cl.⁴ .............................................. B60B 33/00
[52] U.S. Cl. ...................................... 16/18 CG; 16/32
[58] Field of Search .................. 16/19, 18 CG, 30, 32, 16/33; 280/43, 43.20, 43.24, 755, 763.1

[56] References Cited

U.S. PATENT DOCUMENTS

| | | | |
|---|---|---|---|
| 664,798 | 12/1900 | Weidman | 16/32 |
| 1,068,485 | 7/1913 | Davidson | 16/18 CG |
| 3,441,974 | 5/1969 | Dean | 16/18 CG |

FOREIGN PATENT DOCUMENTS 234265  7/1910  Fed. Rep. of Germany .......... 16/32

Primary Examiner—Nicholas P. Godici
Assistant Examiner—William Scott Andes
Attorney, Agent, or Firm—Morton J. Rosenberg

[57] ABSTRACT

This invention relates to a castor positioning device and in particular to one including a positioning shell generally conical in shape and having a hole at the top and an open end at the bottom, an actuating member formed at the center with a threaded through hole and a hexagonal contour from which extends downwardly an engaging portion having a thin stopper at the bottom end thereof and a castor having on the top a vertical screw extending upwardly through the hole of the positioning shell and then engaged with the threaded through hole of the actuating member, whereby the invention is applicable to be mounted on machines with or without transverse rods at the bottom frame thereof.

1 Claim, 7 Drawing Sheets

4,800,617

CASTOR POSITIONING DEVICE

BACKGROUND OF THE INVENTION

This invention relates to a castor positioning device.

It has long been known to mount castors on the bottom frame of a machine so as to facilitate the movement thereof. Anyway, the machine has to be used in a steady and fixed position and so it is necessary to dispose positioning devices on the bottom frame of the machine in addition to the castors.

Unfortunately, none of the known positioning devices on the market is satisfactory in use. With reference to FIG. 1, there is shown the application of a prior art positioning device. The positioning device has a stand 11 on which there is vertically mounted a screw 1 and is rigidly fixed on a transverse rod 13 of the machine by engaging a nut 12 with the screw 1. Hence, the stand 11 can be adjusted in height by turning the screw 1.

However, if the machine does not have transverse rods at the bottom frame thereof, it will be impossible to mount the positioning device thereon (see FIG. 3). It is, therefore, an object of the present invention to provide an improved castor positioning device which may obviate and mitigate the above-mentioned drawbacks.

SUMMARY OF THE INVENTION

This invention relates to a castor positioning device.

It is the primary object of the present invention to provide a castor positioning device which is a combined castor and positioning device.

It is another object of the present invention to provide a castor positioning device which can be easily mounted in all kinds of machine.

It is still another object of the present invention to provide a castor position device which is simple in construction.

It is a further object of the present invention to provide a castor positioning device which is facile to manufacture.

It is still a further object of the present invention to provide a castor positioning device which is economic to produce.

Other objects and advantages of the invention will be apparent from the following description and the accompanying drawings in which smilar characters of reference indicate similar parts throughout the several views.

DETAILED DESCRIPTION OF THE PREFERRED EMBODIMENT

Figure 1:
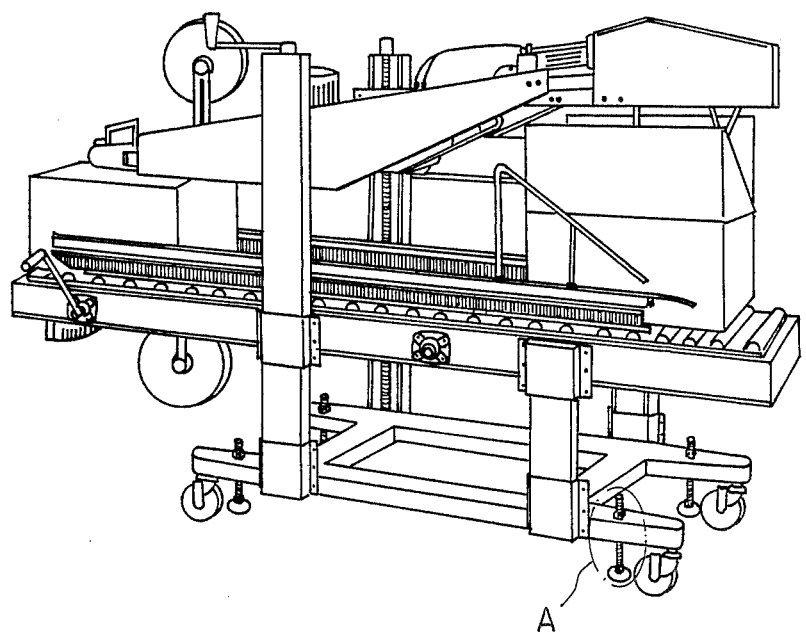
FIG. 1 is a perspective view showing the application of a prior art positioning device.
Figure 2:
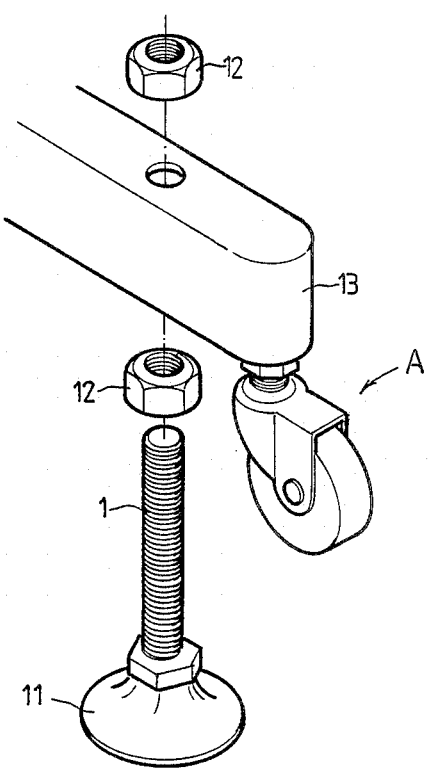
FIG. 2 is an enlarged framentary view of the portion A—A of FIG. 1.
Figure 3:
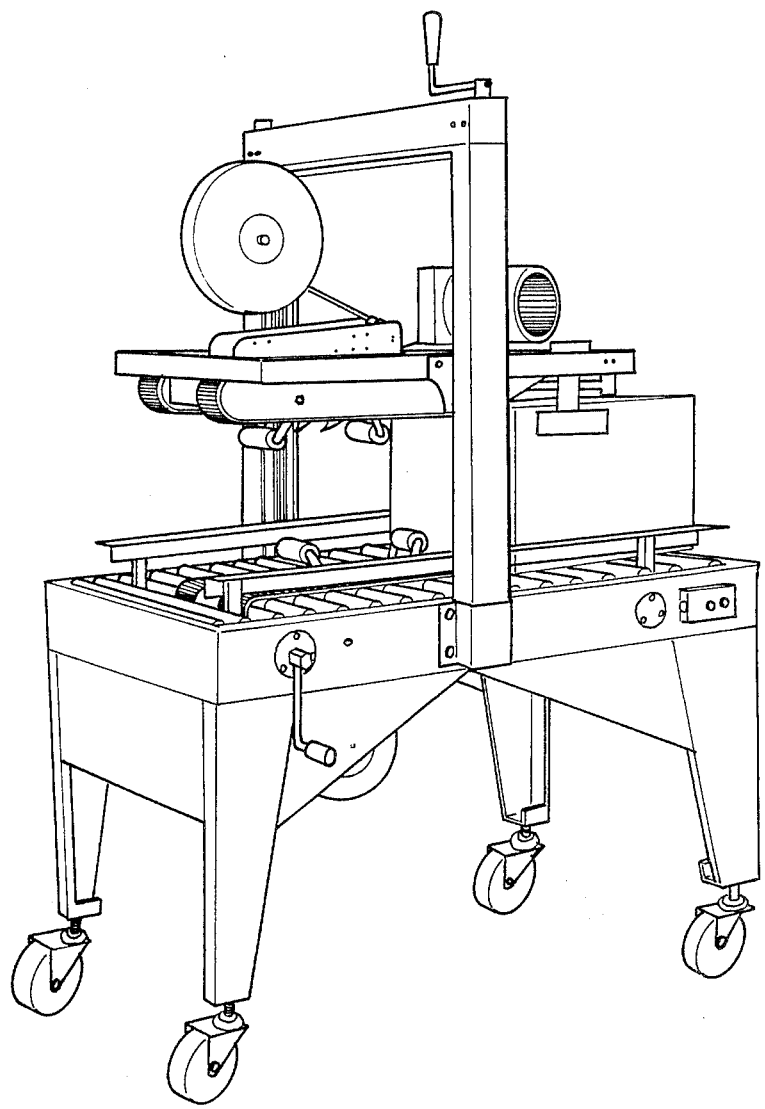
FIG. 3 shows that it is impossible to mount the prior art castor positioning device on a machine without transverse rod.

For purposes of promoting an understanding of the principles of the invention, reference will now be made to the embodiment illustrated in the drawings. Specific language will be used to describe same. It will, nevertheless, be understood that no limitation of the scope of the invention is thereby intended, and such further applications of the principles of the invention as illustrated herein being contemplated as would normally occur to one skilled in the art to which the invention relates.

Figure 4:
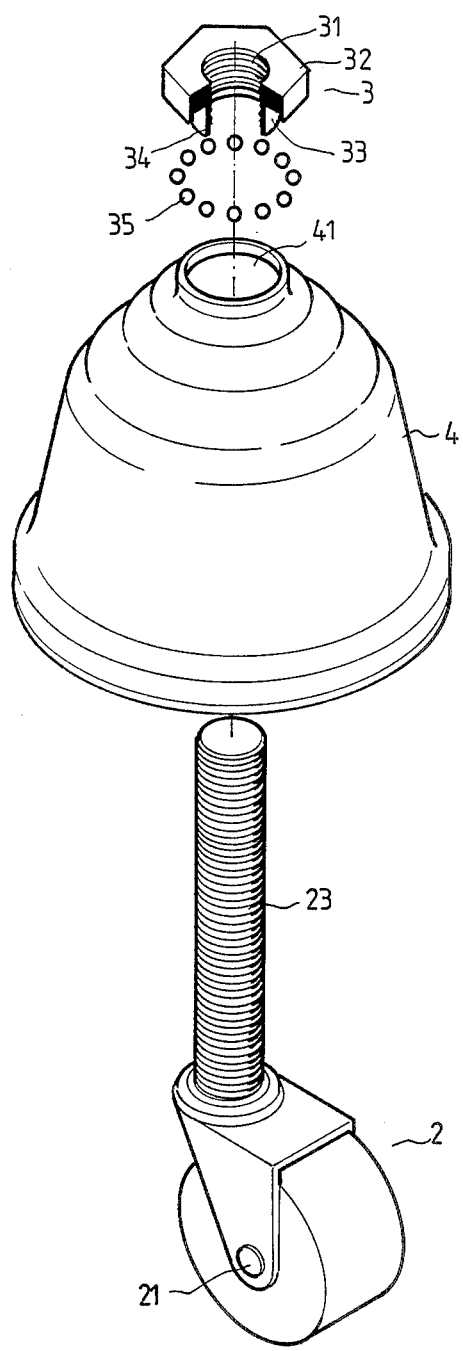
FIG. 4 is an exploded view of a castor positioning device according to a preferred embodiment of the present invention.

Referring to the drawings and in particular to FIG. 4 thereof, the castor positioning device according to the present invention mainly comprises a castor 2, an actuating member 3 and a positioning shell 4. The castor 2 may turn and move easily by means of an axle 21 and steel balls 22. It is noted that such mechanism is well known in the art and has no need to describe here in detail. On the castor 2 there is vertically mounted a screw 23.

The actuating member 3 is formed with a hexangonal contour 32 and a through hole 31 at the center. Below the hexagonal contour 32 is an engaging portion 33 which in turn has a thin stopper 34 at the bottom end thereof. A plurality of steel balls 35 are disposed under the hexagonal contour 3.

The positioning shell 4 is generally conical in shape and has a smaller hole 41 at the top and an open end at the bottom so that the castor 2 may turn freely therein.

Figure 5:
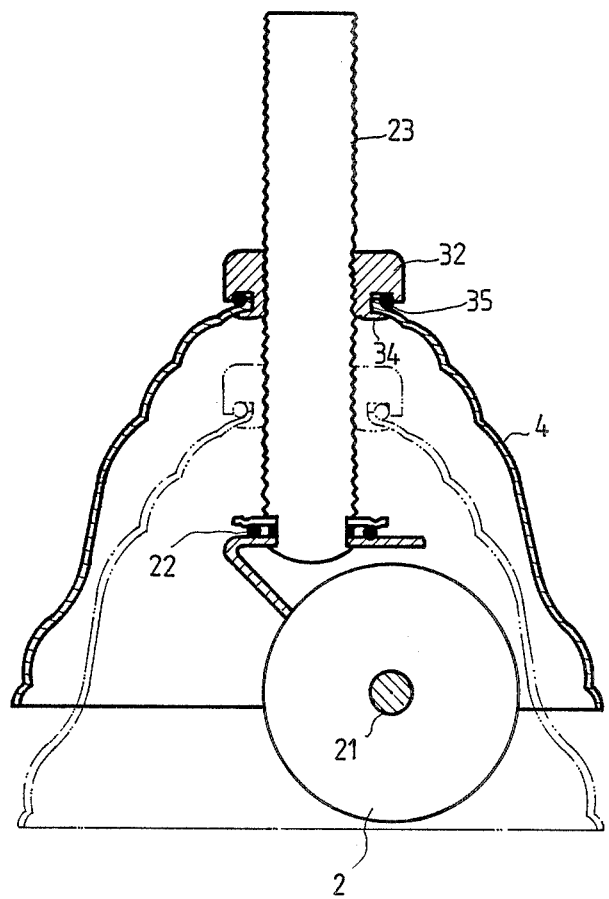
FIG. 5 is a sectional view showing the assembly of FIG. 4.

Looking now at FIG. 5, in assembly, the positioning shell 4 is first put on to the engaging portion 33 of the actuating member 3 and then the enaging portion 33 is pressed outwards to form a stopper 34. Thus, the positioning shell 4 may rotate about the engaging portion 33 and is kept in position by the stopper 34. As previously mentioned, the steel balls 35 are disposed under the hexagonal contour 32 of the actuating member 3 and so even if the positioning shell 4 is subjected to external forces, the actuating member 3 can still rotate freely. As soon as the actuating member 3 is engaged with the positioning shell 4, the screw 23 of the castor 2 is threadedy engaged with the threaded hole 31 of the actuating member 3 thereby achieving the assembly of the present invention. Further, when the actuating member 3 is rotated, the positioning shell 4 will be moved longitudinally.

When desired to move the machine, first make sure that the bottom end of the positioning shell 4 is higher than the bottom end of the castor 2. Then, move the machine to the destined position and turn the actuating member 3 to lower the positioning shell 4 to the ground. Since the positioning shell 4 is pivotally mounted on the engaging portion 33 of the actuating memer 3, the positioning shell 4 will not be rotated in case the actuating member 3 is further twisted when the positioning shell 4 has already been in contact with the ground, but instead, the castor 2 will be raised thereby causing only the positioning shell 4 to support the machine.

Figure 6:
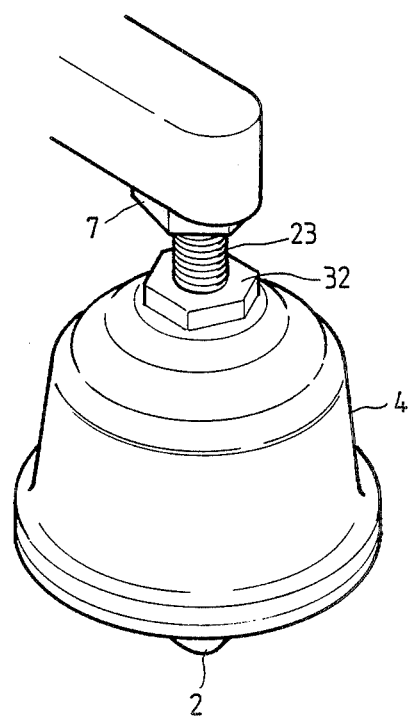
FIG. 6 is a working view of the present invention.
Figure 7:
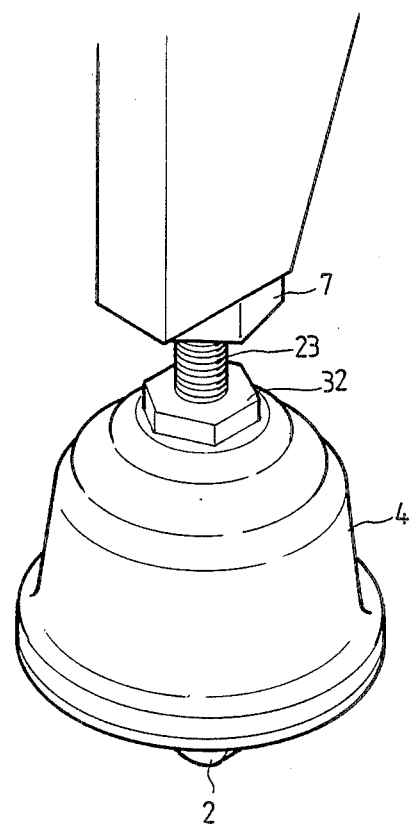
FIG. 7 is another working view of the present invention.

With reference to FIGS. 6 and 7, there are shown two applications of the present invention. As may be seen, the present invention is applicable to machines with or without transverse rods at the bottom frame thereof. Moreover, since the present invention is directly mounted on the bottom frame of the machine, there will be a larger distance between the positioning shells as compared with the prior art hence further stabilizing the machine. As to the connection of the present invention to the machine, a nut 7 can be conveniently used to achieve that purpose.

The various features of novelty which characterize the invention are pointed out with particularity in the claim annexed to and forming a part of this disclosure. For a better understanding of the invention, its operating advantages and specific objects attained by its use, reference should be had to the accompanying drawings and descriptive matter in which there is illustrated and described preferred embodiment of the invention.

I claim:

1. In combination, a castor and a positioning device comprising:

a positioning shell generally conical in shape and having a hole at the top and an open end at the bottom;

an actuating member with a threaded through hole formed at its center and a hexagonal contour from which extends downwardly an engaging portion having a thin stopper flange at the bottom end thereof, said actuating member being disposed on the positioning shell with the stopper flange first extending downwardly through the hole of the positioning shell and then pressed to hold the positioning shell, said actuating member further having a plurality of steel balls captured between the bottom of the hexagonal contour and the shell so that the actuating member can turn freely with respect to the positioning shell; and a castor having on the top a vertical screw extending upwardly through the hole of the positioning shell and then threadedly engaged with the threaded through hole of the actuating member.

* * * * *